(12) United States Patent
Colonna

(10) Patent No.: US 6,386,728 B1
(45) Date of Patent: May 14, 2002

(54) DECORATIVE LIGHT ASSEMBLY

(76) Inventor: John P. Colonna, 6126 Turnberry Park Dr. Apartment 10102, Sarasota, FL (US) 34243

( * ) Notice: Subject to any disclaimer, the term of this patent is extended or adjusted under 35 U.S.C. 154(b) by 0 days.

(21) Appl. No.: 09/710,428

(22) Filed: Nov. 10, 2000

(51) Int. Cl.$^7$ ............................................ F21W 121/04
(52) U.S. Cl. ...................... 362/123; 362/565; 362/568; 362/806; 362/323; 362/280
(58) Field of Search .................. 362/277, 280, 362/282, 322, 323, 324, 806, 565, 568, 564, 123

(56) References Cited

U.S. PATENT DOCUMENTS

| | | | |
|---|---|---|---|
| 4,415,953 A | * 11/1983 | Shepherd | 362/123 X |
| 4,591,227 A | 5/1986 | Colonna | 339/157 |
| 4,736,282 A | 4/1988 | Ahroni | 362/123 |
| 4,764,128 A | 8/1988 | Cheng | 439/652 |
| 5,226,709 A | * 7/1993 | Labranche | 362/123 X |
| 5,702,170 A | * 12/1997 | Broderick | 362/123 X |
| 5,746,504 A | * 5/1998 | Dodson | 362/123 |
| 6,224,231 B1 | * 5/2001 | Personius | 362/123 |

* cited by examiner

Primary Examiner—Laura K. Tso
(74) Attorney, Agent, or Firm—Gifford, Krass, Groh Sprinkle, Anderson & Citkowski, P.C.

(57) ABSTRACT

A decorative light assembly for illuminating Christmas trees and the like having a ring shaped housing containing a DC light source and a motor drive for rotatably driving one of a series of interchangeable disks disposed in the path of the light source and providing variable light patterns through the disk which communicate with fiber optic strands to receive and distribute light received through the disks from the light source.

3 Claims, 4 Drawing Sheets

DECORATIVE LIGHT ASSEMBLY

BACKGROUND OF THE INVENTION

1. Field of the Invention

The present invention relates to decorative light sets and more particularly to a light set in the form of fiber optic strands which extend from the top of a tree or the like and provided with means to sequentially provide light to the fiber optic strands to create a defined light pattern.

2. The Prior Art

Traditional decorative lights for Christmas trees and the like consist essentially of a pair of electrical connecting wires which connect a plurality of light bulb sockets in series or parallel and having conventional electrical prongs for insertion into a conventional electrical outlet. An electric light bulb is inserted into each of the sockets. Decorated and illuminated Christmas trees are often provided with a plurality of such light sets to achieve the desired effect. Unfortunately, several electrical connectors and extension cords are generally required for placement and the use of a plurality of such light sets on a single tree. Such a use of a plurality of sets with extension cords often results in an overloaded circuit. The combination of such a connector and plurality of light sets is cumbersome to use in illuminating a Christmas tree, and such a combination lacks flexibility for use in decorating and illuminating Christmas trees. Therefore, this arrangement is often costly, cumbersome and unsightly, and occasionally very hazardous.

Part of this problem has been overcome by the decorative light set disclosed in my U.S. Pat. No. 4,591,227 in which is disclosed a Christmas tree light set including a ring adapted to be mounted near the top of a tree with individual strands of lights streaming down from the ring. A single cord is used to electrically connect the strands of lights. This provides a light set which is easier to use than conventional sets but it doesn't entirely remedy the problem of accidental fires.

BRIEF DESCRIPTION OF THE DRAWINGS

A better understanding of the present invention can be had by reference to the drawings in which in which like references characters refer to like parts throughout the several views and in which.

DETAILED DESCRIPTION OF A PREFERRED EMBODIMENT

Figure 1:
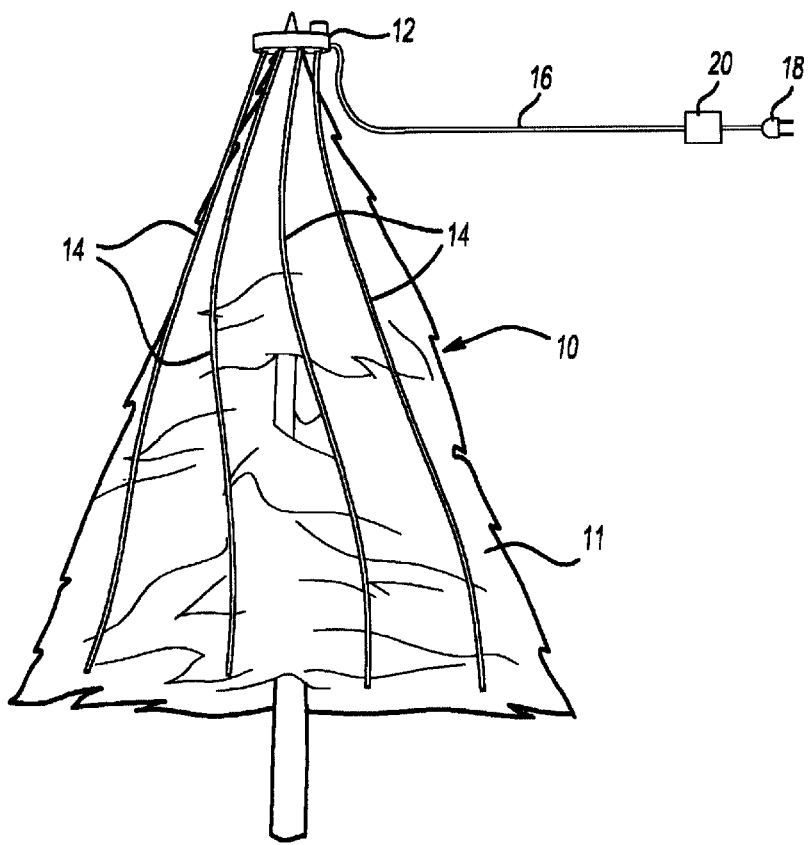
FIG. 1 is an elevational view showing the decorative light set of the present invention in place on a Christmas tree.

Now referring to the drawings for a more detailed description of a preferred embodiment of the invention with several preferred variations, FIG. 1 illustrates a light set 10 of the present invention being used to decorate a Christmas tree 11. The light set 10 consists of a ring shaped assembly 12 and a plurality of fiber optic strands 14 connected to the assembly 12 and radiating downwardly therefrom. An electrical cord 16 is electrically connected to the assembly 12. The cord 16 is shown much shorter in length than it would actually be. It is provided with a conventional male connector 18. A DC transformer 20 converts the AC household current to DC current.

Figure 2:
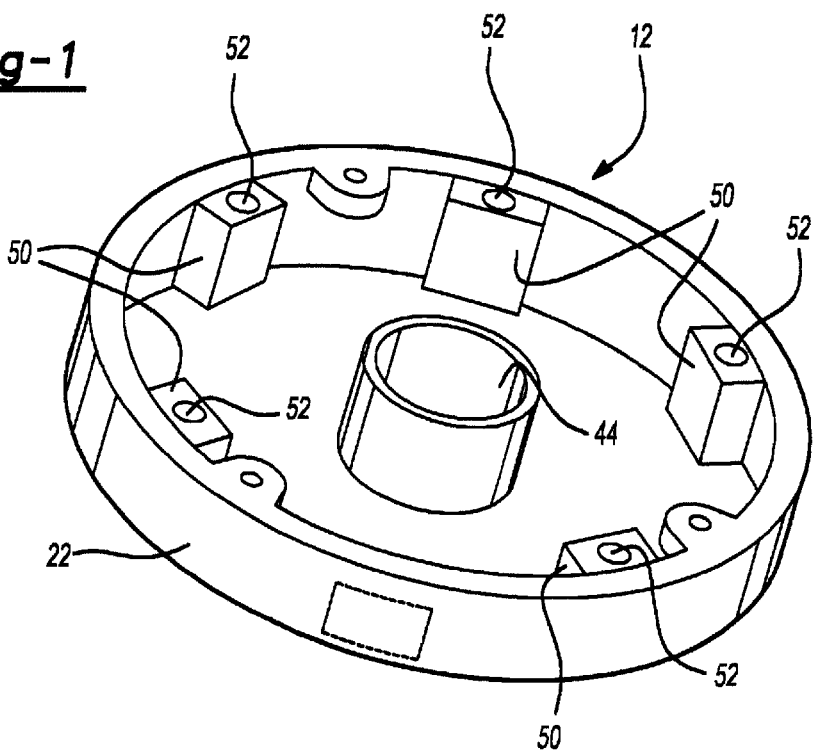
FIG. 2 is a perspective view of a portion of the ring assembly of the present invention
Figure 4:
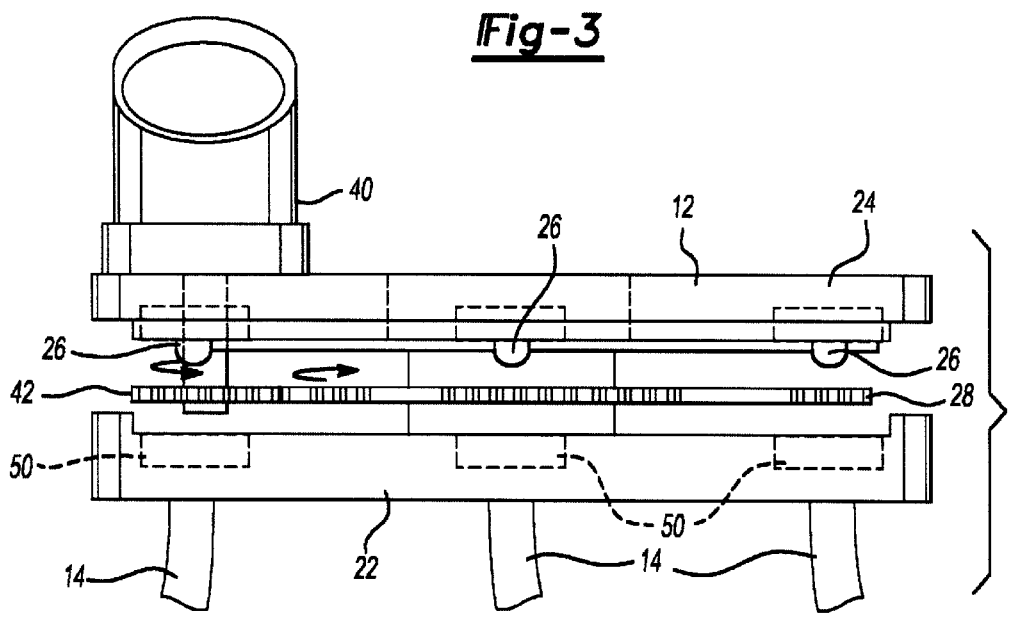
FIG. 4 is a front elevational view of the ring assembly of the present invention.
Figure 6:
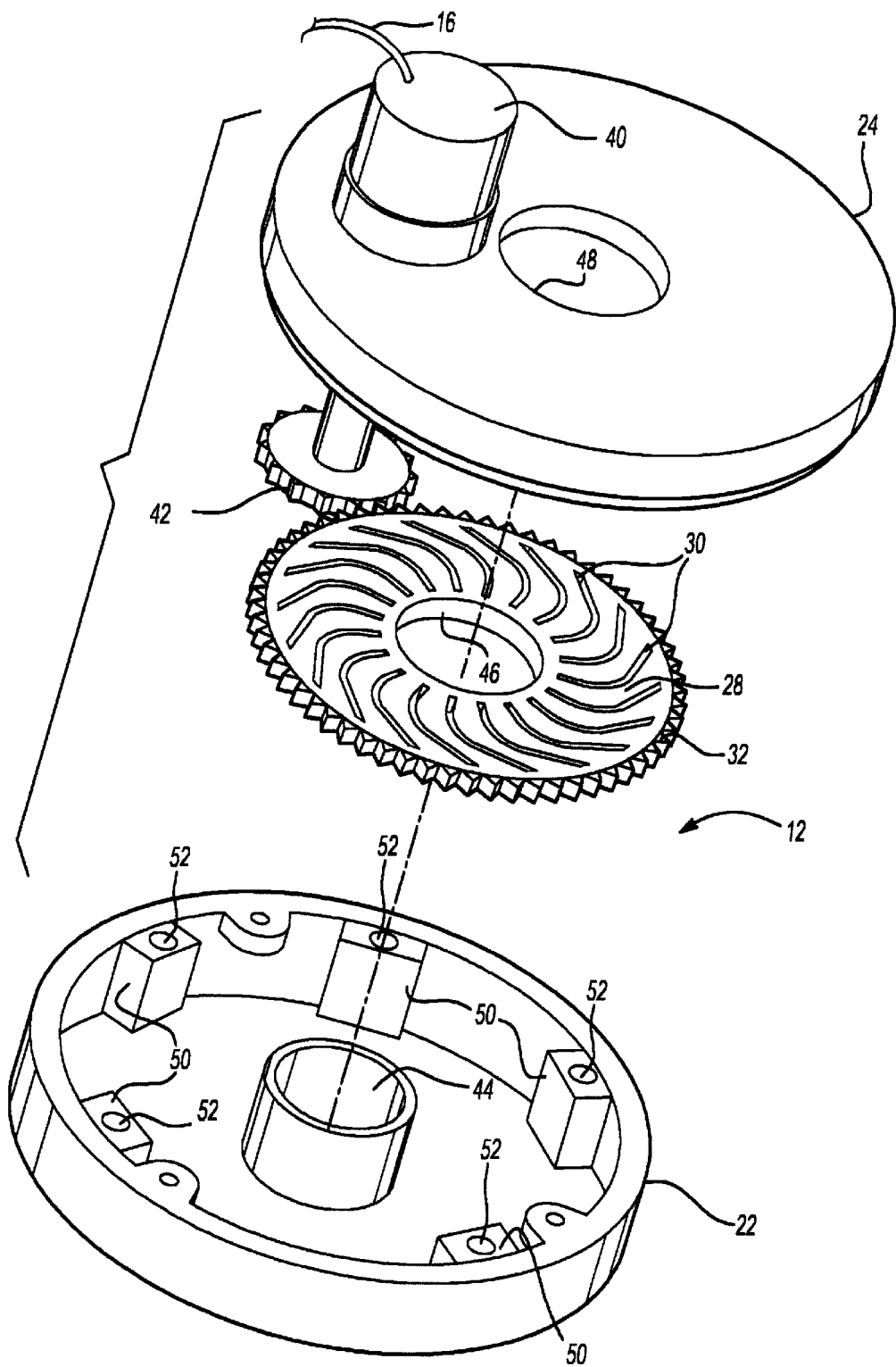
FIG. 6 is an exploded perspective view of the ring assembly of the present invention.

As can best be seen in FIGS. 2, 4 and 6, the ring assembly 12 preferably comprises a bottom housing 22 and a housing cover 24. Light sources such as the white LEDs shown in FIGS. 4 at 26 are positioned around the periphery and in the interior of the housing cover 24. The LEDs 26 are electrically connected to the cord 16 and thus to the DC transformer 20 in a conventional manner.

As can best be seen in FIG. 4 a disk 28 is provided with through openings 30 (FIG. 3) and is rotatably mounted within the bottom housing 22 in a position between the light sources 26 and the ends of the fiber optic strands 14 so that as the disk 28 is rotated, light is alternately permitted through and is blocked from going through the openings 30 in the disk 28 to the ends of the fiber optic strands 14 in a sequence determined by the pattern of the openings 30 provided in the disk 28 As the disk 28 blocks light from being transmitted from the light source 26 to the fiber optic strands 14, the free end of a particular fiber optic strand 14 will not illuminate and will only illuminate as an opening 30 passes between the light source 26 and the attached end of the particular fiber optic strand 14.

Figure 7:
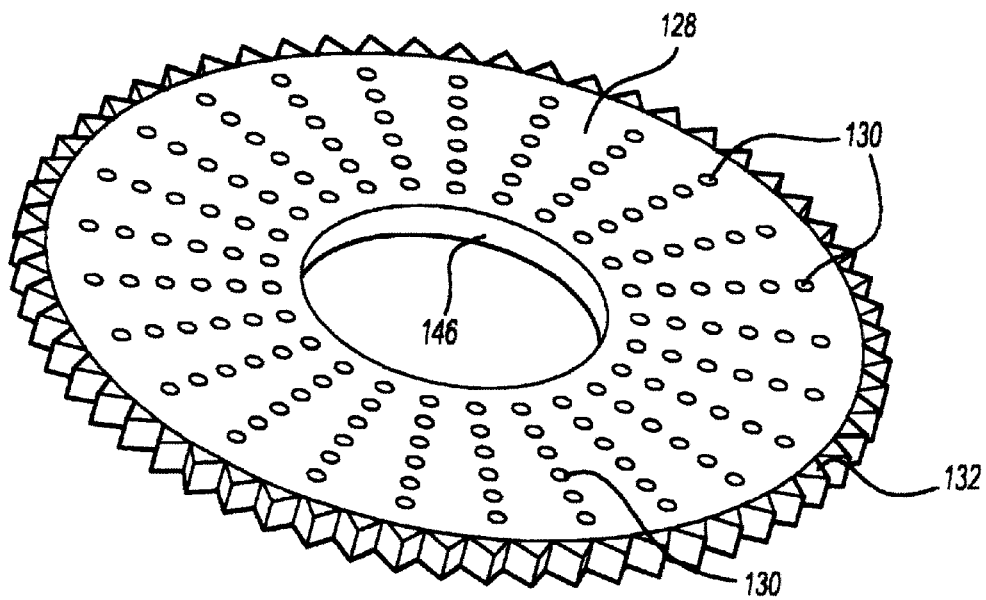
FIGS. 7 and 8 are views similar to FIG. 3 but illustrating other possible hole patterns in the disks.
Figure 8:
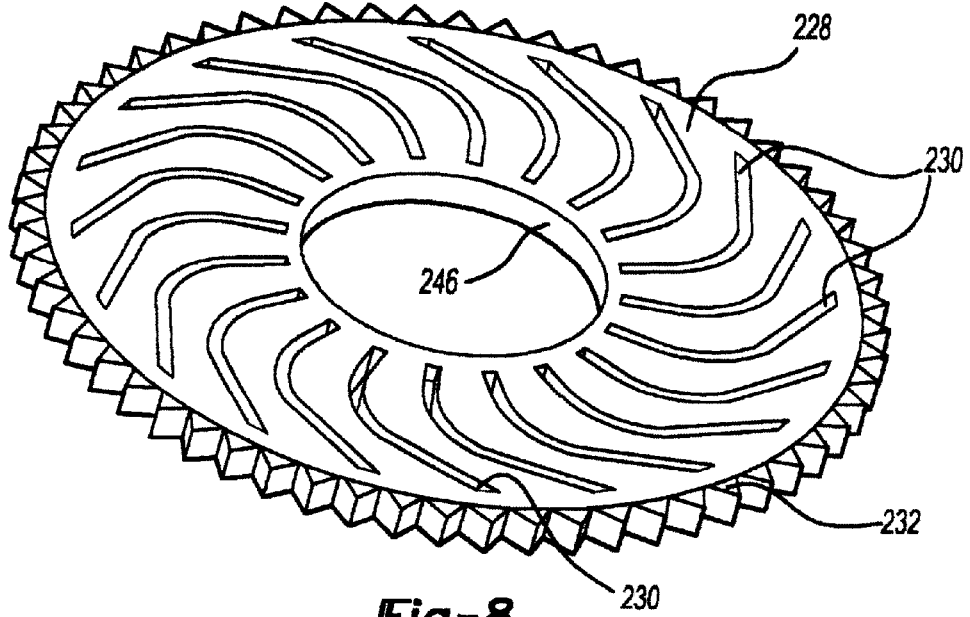

As shown in FIG. 7 and 8, disks 128 FIG. 7 and 228 FIG. 8 are similar to the disk 28 but are provided with a series of openings 130 and 230 respectively which provide a pattern different than the pattern provided by disk 28. It should be apparent that many different patterns could be achieved by using openings in disks other than those shown in the drawings.

Figure 3:
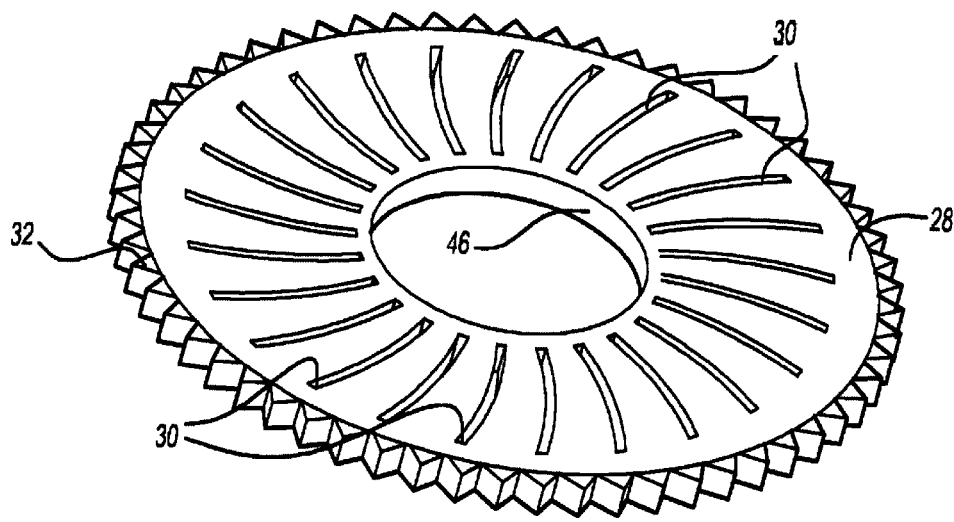
FIG. 3 is a perspective view of one preferred disk of the present invention.

Referring to FIGS. 3, 7 and 8 each disk 28, 128 and 130 is provided with an exterior gear portion 32, 132 and 232, respectively, to permit the disk 28, 128, 228 to be rotated within the ring assembly 12 by an electric motor 40 (FIGS. 4 and 6). A output gear 42 driven by the motor 40 meshes with the gear portion 32 of the disk 28. The motor 40 and the LED light sources 26 receive DC electrical current through the DC transformer 20 (FIG. 1).

The bottom housing 22, the disk, and the housing cover 24 are each provided with an opening 44, 46, and 48, respectively, which when the ring assembly 12 is assembled provide an opening through the ring assembly 12 to permit the ring assembly 12 to be mounted to a Christmas tree 11 or the like in the manner shown in FIG. 1, i.e. with the top of the tree 11 extending though the opening in the ring assembly 12. The disks 128 and 228 are also provided with central openings 146 and 246 respectively.

As can be seen in FIGS. 2 and 6 the bottom housing 22 is provided with circumferentially spaced blocks 50 having through openings 52 which provide the means for retaining the ends of the fiber optic strands and for transmitting the light from the light sources 26 to the ends of the fiber optic strands 14.

Figure 5:
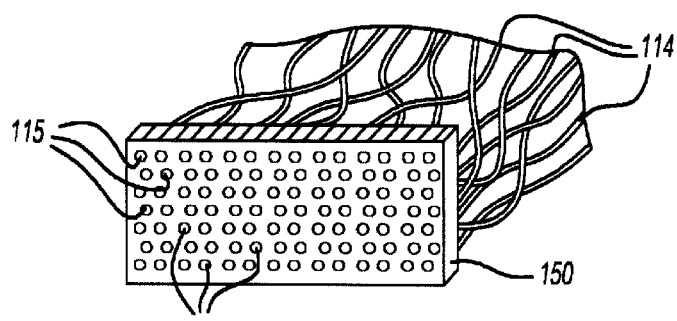
FIG. 5 is a fragmentary view of a portion of the structure illustrated in FIG. 4 but showing another preferred construction of a portion of the present invention.

FIG. 5 illustrates a preferred modification in which a plurality of fiber optic strands 114 are connected to a single block 150 with the ends 115 of the fiber optic strands 114 exposed to the light from the slight sources 26 (not shown).

To provide different light patterns from the fiber optic strands patterns, the disk 28 would be removed and replaced by a new disk 128 or 228 having a different pattern of through openings 130 or 230.

While the fiber optic strands 14 have been illustrated as being substantially in length it is apparent that by varying the length a more varied pattern of light distribution can be achieved.

It is also apparent that the present invention provides an electric light assembly for decorating and illuminating Christmas trees and the like with all of the electric components using low voltage DC current so that the light set of the present invention is substantially safer than the light sets of the prior art. The ring shaped housing can be easily fitted over the top of the Christmas tree with the bundles of fiber optic strands radiating downward and outward so that the light of the fiber strands decorates and illuminates the tree.

Utilizing disks with different hole patterns and utilizing fiber optic strands of different lengths provides a Christmas light assembly capable of producing a variety of visual effects. It should be understood that for illustrative purposes a light assembly having as relatively small number of fiber optic strands has been shown but in practice many more strands would be provided than those shown.

It should be apparent that other changes modifications could be made to the preferred embodiment disclosed without departing from the spirit of the invention as set forth in the attached claims.

I claim:

1. An electrical light set for decorating and illuminating a Christmas tree and the like comprising:

a) a ring shaped housing adapted to be mounted near the top of said tree;

b) a DC light source disposed within said housing;

c) a plurality of fiber optic strands each having an end attached to said housing to receive light emitted from said light source and adapted to extend downwardly from said ring shaped housing to illuminate said tree or the like.

2. The light set as defined in claim 1 and further comprising:

a) a motor mounted to said housing and a disk rotatably mounted in said housing intermediate said light source and said fiber optic strands;

b) said disk having a plurality of openings to sequentially block and open light communication between said light source and said fiber optic strands as said disk rotates; and c) means to selectively rotate said disks.

3. The light set as defined in claim 2 and in which a plurality of disks are provided;

said disks each having different patterns of openings to provide different sequences of light emitted by said fiber optic strands and said disks being interchangeable within said ring shaped housing.

* * * * *